United States Patent
DeLong et al.

(10) Patent No.: US 7,260,105 B2
(45) Date of Patent: Aug. 21, 2007

(54) REDUCED PEAK EMI BUS USING VARIABLE BIT RATE SPREADING

(75) Inventors: Ronald V. DeLong, Mesa, AZ (US); Kevin Anderson, Phoenix, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 1146 days.

(21) Appl. No.: 10/194,351

(22) Filed: Jul. 12, 2002

(65) Prior Publication Data
US 2004/0008624 A1    Jan. 15, 2004

(51) Int. Cl.
*H04L 12/56* (2006.01)
(52) U.S. Cl. ............... 370/419; 370/463; 375/346; 713/400
(58) Field of Classification Search .......... 370/252, 370/463, 419, 518, 503, 421; 375/148, 149, 375/346; 713/300, 400
See application file for complete search history.

(56) References Cited

U.S. PATENT DOCUMENTS

| 6,144,748 | A | * | 11/2000 | Kerns | .......... 381/312 |
| 6,681,337 | B1 | * | 1/2004 | Smith et al. | ......... 713/400 |
| 6,948,080 | B2 | * | 9/2005 | Farwell | .......... 713/300 |

* cited by examiner

*Primary Examiner*—John Pezzlo
(74) *Attorney, Agent, or Firm*—Fulbright & Jaworski LLP

(57) ABSTRACT

Systems and methods are described for a reduced peak EMI bus using variable bit rate spreading. A method for reducing radiated Electro-Magnetic Interference from a wire communication bus transferring data between one or more physically separate modules or units comprises changing a data clock period controlling a rate of data bits on a communications bus. A Distributed Systems Interface communication bus data transmission protocol includes: alternating a data bit-rate between a first bit-rate and a second bit-rate on a bit-by-bit basis; transmitting a bit over the distributed systems interface communication bus according to the alternating data bit-rate; and varying a difference between the first bit-rate and the second bit-rate.

23 Claims, 3 Drawing Sheets

REDUCED PEAK EMI BUS USING VARIABLE BIT RATE SPREADING

BACKGROUND OF THE INVENTION

1. Field of the Invention

The invention relates generally to the field of communications. More particularly, the invention relates to the transmission of data over a wire communication bus.

2. Discussion of the Related Art

Radiated Electro-Magnetic Interference (EMI) is a problem inherent to most communication buses which convey data between one or more physically separated modules or computing machines. It is caused by the generation and emission of unwanted radio frequency signals that can interfere with radio receivers. In the United States, the Federal Communications Commission (FCC) has set forth strict rules about the maximum amount of EMI that a communications bus system can radiate. Equivalent regulatory bodies have similar functions in other countries.

Meanwhile, strict limits on the EMI radiated by communication bus wires in a motor vehicle have been set by the major manufacturers of motor vehicles in order to avoid objectionable interference to the receivers in entertainment, navigation, and radio communications. As data rates and the number of communications busses between modules increase, EMI compliance becomes more stringent and difficult to achieve.

A significant amount of effort has been made to reduce radiated EMI in automotive environments. EMI testing is still one of the most difficult tests for a medium to high data-rate automobile wired communication bus to pass.

Automobiles may have dedicated high-speed communications circuits to perform specific tasks. For example, a Distributed Systems Interface (DSI) bus can link safety-related sensors and components, enabling the use of intelligent sensors and actuators such as airbags, weight sensors, seatbelt pre-tensioners and side-impact protection systems.

One unsatisfactory approach, in an attempt to reduce radiated EMI in a communication bus, involves utilizing balanced or shielded wires. A disadvantage of this approach is the high-cost and added weight of such wiring. Another approach, in an attempt to solve the above mentioned problem, includes utilizing a signal shaping technique. However, signal shaping techniques can limit the maximum data rate and are limited themselves by the required data rates.

Until now, the requirements of providing a wire communication system between physically separated modules that meets EMI emission standards without reducing the data rate and signaling margins, or adding to wiring complexity and increasing the hardware cost, have not been met.

SUMMARY OF THE INVENTION

There is a need for the following embodiments. Of course, the invention is not limited to these embodiments.

According to an aspect of the invention, a method for reducing radiated Electro-Magnetic Interference from a communication bus transferring data between one or more physically separate modules or units comprises: changing a data clock period controlling the rate of data bits on a communications bus. According to another aspect of the invention, a Distributed Systems Interface communication bus data transmission protocol includes: alternating a data bit-rate between a first bit-rate and a second bit-rate on a bit-by-bit basis; transmitting a bit over the distributed systems interface communication bus according to the alternating data bit-rate; and varying a difference between the first bit-rate and the second bit-rate.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
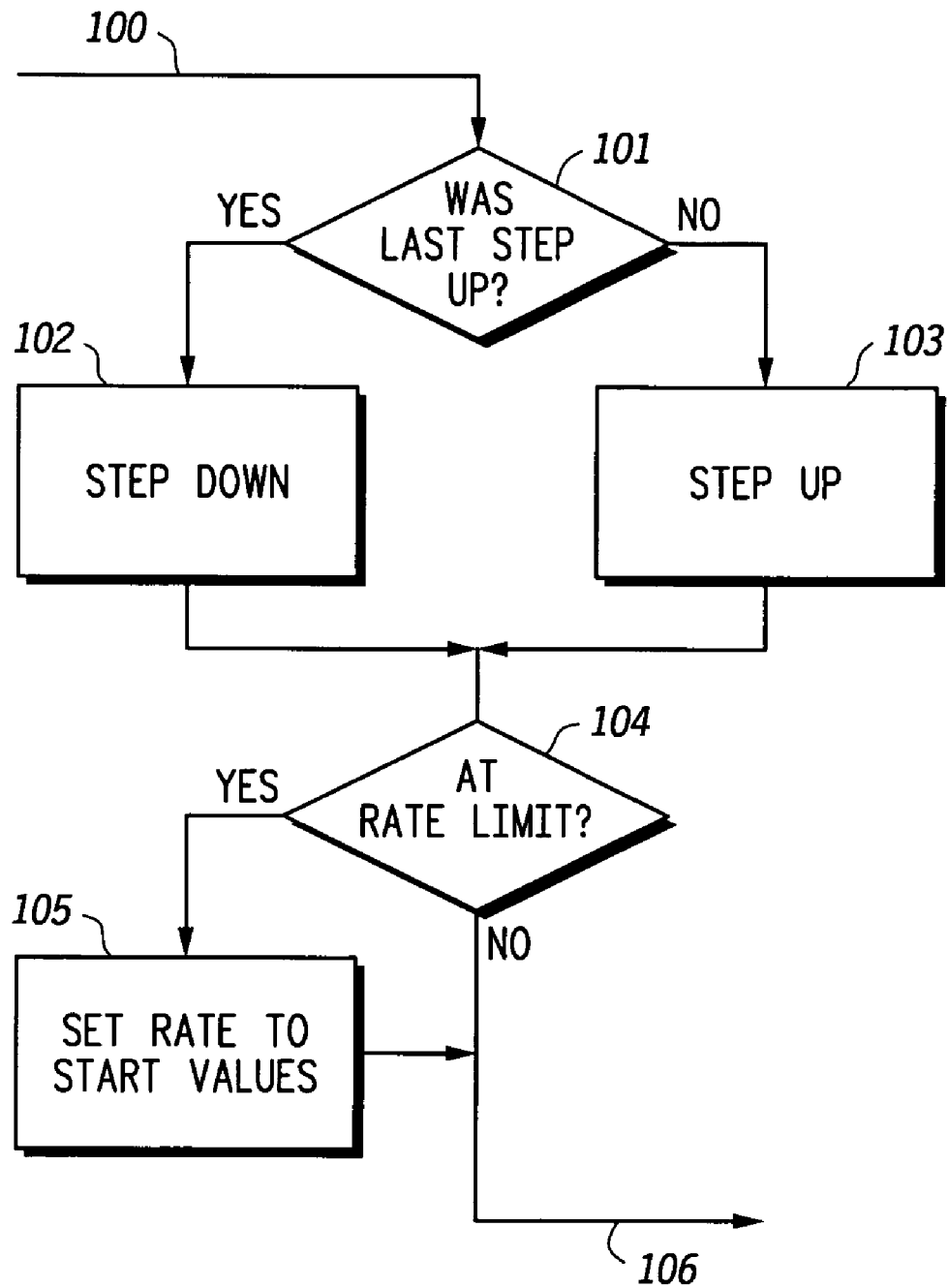
FIG. 1 is a flow diagram of a spreading algorithm, representing an embodiment of the invention.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating specific embodiments of the invention, are given by way of illustration only and not by way of limitation. Various substitutions, modifications, additions and/or rearrangements within the spirit and/or scope of the underlying inventive concept will become apparent to those of ordinary skill in the art from this disclosure.

In general, the context of the invention can include communications. The context of the invention can include a variable bit-rate communication bus. The context of the invention can also include an automobile communication bus.

A practical application of the invention that has value within the technological arts is reducing peak radiated Electro-Magnetic Interference from a wired bus between one or more physically separated units or modules via a variable bit-rate communication bus. Further, the invention is useful in conjunction with a distributed systems interface, or the like. There are virtually innumerable other uses for the invention, as will be understood by those of ordinary skill in the art.

A reduced peak radiated EMI communications bus between physically separated units or modules using variable bit-rate spreading, representing an embodiment of the invention, can be cost effective and advantageous for at least the following reasons. The invention provides a method and/or apparatus to reduce EMI radiation without limiting the data transfer rate, and without the need for expensive drivers, wiring or shielding. The invention improves quality and/or reduces costs compared to previous approaches.

Further, variation may be made in the steps or in the sequence of steps composing methods described herein.

Further, although the methods and/or apparatuses described herein can be a separate module, it will be manifest that the methods and/or apparatuses may be integrated into the system with which they are associated. Furthermore, all the disclosed elements and features of each disclosed embodiment can be combined with, or substituted for, the disclosed elements and features of every other disclosed embodiment except where such elements or features are mutually exclusive.

Radiated Electro-Magnetic Interference (EMI) is a problem for all communications buses. These radiated signals can interfere with the reception of desired radio signals. Significant amounts of effort have gone into reducing this interference in automobiles, and radiated EMI testing it is one of the most difficult tests to pass in an automotive environment for medium to high data-rate communications systems. Designers are commonly operating under pressure to find a way to make the system meet the requirements without reducing data rates and signaling margins, or without adding to the wiring complexity and increasing the hardware cost.

The invention can include a method and/or apparatus for a variable data rate bus technique which can spread the communications spectrum. In one embodiment, the invention can include a software sub-routine which may be added to the data clock rate operation with no changes to the existing hardware. In another embodiment, the invention can include implementing a variable bit-rate algorithm via hardware.

Some of the techniques taught by the invention can be incorporated into a Distributed System Interface Bus protocol, or a data transmission protocol. A Distributed System Interface (DSI) is a two-wire serial bus which can, for example, be utilized in an automobile to link safety-critical sensors and components on a dedicated high-speed communications circuit. DSI can enable the use of intelligent sensors and actuators such as airbags, weigh sensors, seatbelt pre-tensioners and side-impact protection systems.

The invention can include a method for reducing radiated Electro-Magnetic Interference from a communication bus transferring data between one or more physically separate modules or units. The invention can also include a method for reducing an Electro-Magnetic Interference (EMI) or a peak EMI radiation from a data bus. The method can include an algorithm to rapidly change the bit-rate of the communication bus so that radio frequency signals generated are not on a continuous discrete set of frequencies. The method can be implemented via a signaling technique that allows bit rate variation on a message-by-message basis, word-by-word basis, bit-by-bit basis, or any other grouping. The method can be implemented via software and/or hardware, such as a state machine hardware in an integrated circuit design.

Referring to FIG. 1, a flow diagram of a spreading algorithm is depicted. The algorithm can be implemented, for example, by a computer program. The algorithm can also be implemented in an integrated circuit, or in an application specific integrated circuit (ASIC). A next command line 100 is coupled to a last step block 101. The last step block 101 is coupled to a step down block 102 and to a step up block 103. The step down block 102 and step up block 103 are coupled to a rate limit block 104. The rate limit block 104 is coupled to the set rate block 105. The rate limit block 104 and the set rate block 105 are coupled to a new bit rate signal 106.

Still referring to FIG. 1, the digitally controlled period of the data clock alternates between a first clock period (corresponding to a first data bit-rate) and a second clock period (corresponding to a second data bit-rate) on a message-by-message basis. The first and second clock periods can be clock signals embedded into a data stream. Further, the first clock period may be a longer period (i.e., slower bit-rate) and the second clock period may be a shorter period (i.e., faster bit-rate). The process of alternating between the longer period and the shorter period may be done in conjunction with a varying difference between the longer period and the shorter period. Typically, values for the faster and slower bit-rates correspond to frequencies in the MHz region.

Still referring to FIG. 1, in this embodiment, alternating between the longer and shorter period has the added advantage that any message-pair takes the same overall length of time to transmit. In a system where data sent is followed by a corresponding return of data from the device being communicated with, the overall transaction time is the same, even though the two message rates were different. One of ordinary skill in the art will recognize that such an advantage may not manifest itself in all embodiments taught by the invention.

Still referring to FIG. 1, the next command line 100 indicates that a new bit-rate is to be determined. The last step block 101 assesses whether the last iteration yielded a step up (or down) in bit-rate. The varying difference between the longer period and the shorter period can be, for example, steadily increasing. The step down block 102 can divide the current bit-rate by a number proportional to the number of such iteration. The step up block 103 can multiply the current bit-rate by a number proportional to the number of such iteration. Alternatively, the values by which the bit-rate is stepped up or down may found on a look-up table. In another embodiment, the bit-rate is varied according to a pseudo-random sequence, generated via a pseudorandom sequence generator. The utilization of pseudo-random series is well known in the art.

Still referring to FIG. 1, when an upper and lower limit is reached, the rates are reset to their initial values by the set rate block 105 and the sweeping starts again. Alternatively, as one of ordinary skill in the art can appreciate, the lower and higher bit-rates may start at their limits, and move closer to each other with every iteration up to a point where they can be reset to their initial values. The speed at which the pair or bit-rates move at every interaction can be programmable.

This algorithm can be implemented with a few increment/decrement and compare instructions, causing a reduction of the spectral EMI peaks of at least 10 to 14 dB. The invention is not limited to this particular algorithm, as one of ordinary skill in the art will recognize, having the benefit of this disclosure.

A DSI module has been used to verify aspects of the invention. Software was modified to cause the data-rate of each transaction to change according to the block diagram depicted in FIG. 1. One result of this technique due to the protocol of DSI is that the paired high and low bit-rate result in an overall transaction time (transmit command—receive response) which is the same as the transaction time with the spreading algorithm not implemented.

Figure 2A:
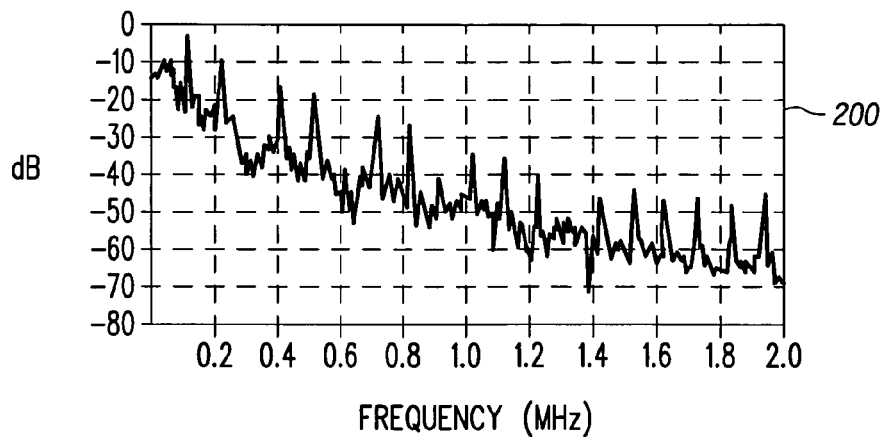
FIGS. 2A-2C are EMI spectra graphs, representing a result of an embodiments of the invention.
Figure 2B:
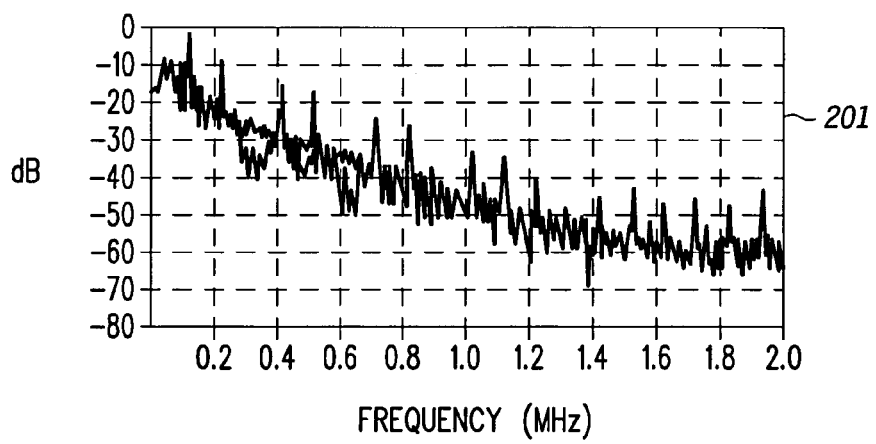
Figure 2C:
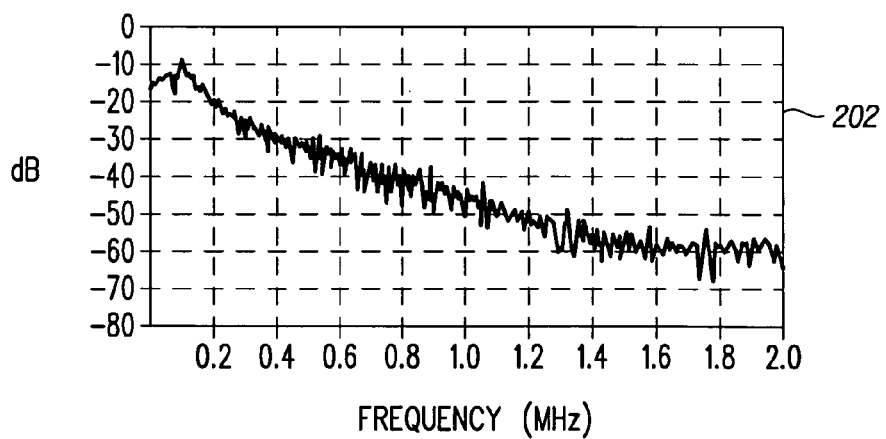

Referring to FIGS. 2A-2C, a set representative of EMI spectra graphs is depicted. The horizontal axis of the graph shows frequency and the vertical shows the relative amplitude. The spectrum analyzer was coupled into the DSI bus and the spectrum measured for a fixed data rate of about 112 Kbps (kilobits per second). This was compared to the spectrum when the data rate was being varied to a maximum of 148 Kbps and minimum of 76 Kbps. Graph 200 illustrates the EMI spectrum without the algorithm (unspread) while graph 202 illustrates the EMI spectrum with the algorithm (spread). Further, graph 202 shows the spreading of an energy across a frequency range. Graph 201 shows a superposition of graphs 200 and 202.

Still referring to FIGS. 2A-2C, the improvement of 10 dB to 14 dB reduction in the spectral peaks are substantial in the struggle to meet EMI requirements.

It is generally understood that the apparent interference of a coherent signal such as one represented by one of the spectral peaks is much higher than a similar level of energy that does not contain a well defined spectral peak. When applied to an Amplitude Modulation (AM) detector, the spectral peaks tend to make tones or buzzing noises, whereas a similar spectrum with the energy not concentrated in well defined peaks tends to make a hissing sound. It is generally understood that hiss has a 15 dB to 30 dB lower perceived level than a tone or buzz of similar energy levels. This means the improvement to the listener using a radio being interfered with by this is even more noticeable than would be indicated by comparing only the peak reductions shown in FIGS. 2A-2C. In the AM Radio band, the perceived improvement in listenability can be over 30 dB.

Frequency Modulation (FM) receivers exhibit a phenomenon called a "capture effect" on coherent signals which are stronger than other signals being received. The effect of this is that for every decibel of coherent interfering signal reduction, more than one decibel of improvement in the detected signal output is obtained. Typically, in an FM entertainment receiver, the "capture effect" results in a 30 dB reduction in interference in the detected audio output which can be obtained by reducing the level of the coherent peak by only 10 dB.

These phenomena are discussed to show the perceived improvement in the end goal of reducing interference in radio receivers is assisted by the invention, by more than even the directly measured amount indicated by the curves in FIG. 2.

Figure 3:
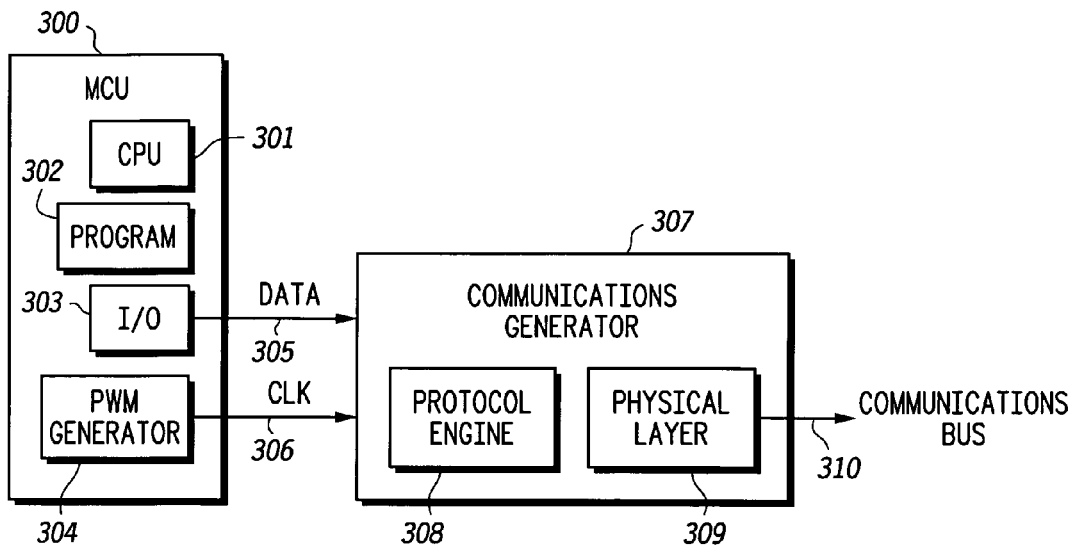
FIG. 3 is a block diagram of a system for translating a spreading algorithm into a physical communications bus data stream, representing an embodiment of the invention.

Referring to FIG. 3, a system for translating a spreading algorithm into a physical communications bus data stream is depicted. A microcontroller (MCU) 300 includes a central processing unit (CPU) 301 to interpret a program 302 and control an input/output (I/O) block 303 and a pulse width modulation generator (PWM GEN) 304. The I/O block 303 is used to pass the data stream into a communications generator 307 and, in this system, the PWM GEN 304 is used to generate a clock signal (CLK) 306 which controls the data rate of the data on a communications bus 310.

Still referring to FIG. 3, the communications generator 307 can use a protocol engine 308 to convert a data 305 into a format that is compatible with the communications generator 307 bus protocol and a physical layer 309 to generate the voltage and currents required for use on the communications bus 310. The PWM GEN 304 can generate a repeating transition logic signal whose period and frequency are set by the CPU 301 under control of the program 302.

Still referring to FIG. 3, the system may adjust the period to achieve the desired rate and then send a message. At the completion of the message being sent, the rate may be changed and another message is sent.

Figure 4:
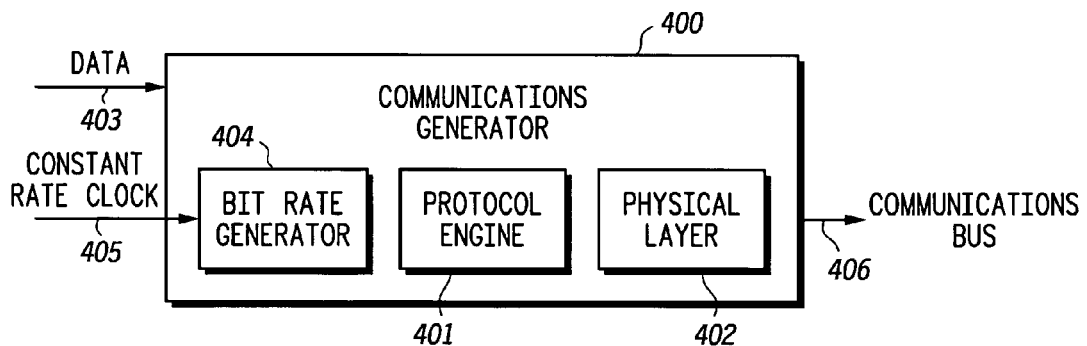
FIG. 4 is a block diagram of a system for translating a spreading algorithm into a physical communications bus data stream directly in logic, representing an embodiment of the invention.

Referring to FIG. 4, a system for translating a spreading algorithm into a physical communications bus data stream directly in logic is depicted. A communications generator 400 contains a protocol engine 401 and a physical layer 402, similar to that in the embodiment of FIG. 3. The communications generator 400 takes the input on a data 403 to be sent on a communications bus 406; again this is similar to FIG. 3.

Still referring to FIG. 4, an added bit rate generator (BIT RATE GEN) 404 can take a constant rate clock signal 405 and create a varying bit rate for the communications bus 406. In this implementation, the rate may be more readily varied on a bit-by-bit basis instead of the message-by-message variation, as used in the system shown in FIG. 3. Changing the rate on a bit-by-bit basis has the added advantage of reducing the peak amplitudes over a wider setting of bandwidth in a spectrum analyzer or a wider receiver bandwidth.

The invention can include communication buses utilizing a variable bit-rate communication bus to reduce peak EMI radiation in automotive environments. Further, as one of ordinary skill in the art will recognize, other embodiments can be readily devised in light of the present disclosure.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically. The term program, as used herein, is defined as a sequence of instructions designed for execution on a computer system. A software can be included in a computer readable media. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method for reducing radiated Electro-Magnetic Interference from a wire communication bus, comprising:
   alternating a data clock period between a first period and a second period on a bit-by-bit basis;
   transmitting a bit over the communication bus according to a bit-rate defined by the data clock period; and
   varying a difference between the first period and the second period.

2. The method of claim 1, further comprising alternating the data clock period between the first period and the second period on a message-by-message basis.

3. The method of claim 1, further comprising alternating the data clock period between the first period and the second period on a word-by-word basis.

4. The method of claim 1, further comprising transmitting a command over the wire communication bus.

5. The method of claim 1, wherein varying the difference includes varying the difference proportionally to a number of an iteration.

6. The method of claim 1, wherein varying a difference includes continuously varying the difference.

7. The method of claim 1, wherein varying the difference includes varying the difference according to a look-up table.

8. The method of claim 1, wherein varying the difference includes varying the difference according to a pseudo-random sequence.

9. The method of claim 1, further comprising spreading an energy across a frequency range.

10. The method of claim 1, further comprising reducing a peak Electro-Magnetic Interference.

11. The method of claim 1, wherein alternating the data clock period includes alternating a clock signal embedded into a data stream.

12. The method of claim 1, further comprising resetting the difference to an initial value when the bit-rate reaches a limit.

13. A computer readable media comprising computer executable instructions, where the instructions, when executed, reduce radiated Electro-Magnetic Interference from a wire communication bus by:
   alternating a data clock period between a first period and a second period on a bit-by-bit basis;
   transmitting a bit over the communication bus according to a bit-rate defined by the data clock period; and
   varying a difference between the first period and the second period.

14. A Distributed Systems Interface, for being coupled to a wire communication bus, the distributed systems interface reducing radiated Electro-Magnetic Interface from the wire communication bus and comprising:
   a processor for providing data and a data clock; and
   a communications generator coupled to the processor, the communications generator alternating a data clock period between a first period and a second period on a bit-by-bit basis, transmitting a bit over the wire communication bus according to a bit-rate defined by the data clock period, and varying a difference between the first period and the second period.

15. A Distributed Systems Interface communication bus data transmission protocol, comprising:
   alternating a data bit-rate between a first bit-rate and a second bit-rate on a bit-by-bit basis;
   transmitting a bit over the distributed systems interface communication bus according to the alternating data bit-rate; and
   varying a difference between the first bit-rate and the second bit-rate.

16. The Distributed Systems Interface data transmission protocol of claim 15, further comprising alternating the data bit-rate between the first bit-rate and the second bit-rate on a command-by-command basis.

17. The Distributed Systems Interface data transmission protocol of claim 15, further comprising transmitting a command over the communication bus.

18. The Distributed Systems Interface data transmission protocol of claim 15, wherein varying the difference includes varying the difference proportionally to a number of an iteration.

19. The Distributed Systems Interface data transmission protocol of claim 15, wherein varying a difference includes continuously varying the difference.

20. The Distributed Systems Interface data transmission protocol of claim 15, wherein varying the difference includes varying the difference according to a look-up table.

21. The Distributed Systems Interface data transmission protocol of claim 15, further comprising resetting the difference to an initial value when the data bit-rate reaches a limit.

22. The Distributed Systems Interface data transmission protocol of claim 15, wherein varying the difference includes varying the difference according to a pseudo random sequence generator.

23. A computer readable media comprising computer executable instructions for implementing the Distributed Systems Interface communication bus data transmission protocol, the instructions implementing the protocol when executed, said protocol comprising:
   alternating a data bit-rate between a first bit-rate and a second bit-rate on a bit-by-bit basis;
   transmitting a bit over the distributed systems interface communication bus according to the alternating bit-rate; and
   varying a difference between the first bit-rate and the second bit-rate.

* * * * *